Sept. 3, 1968 R. F. DURIG 3,400,270
FLASH DETECTION MEANS
Filed May 10, 1965
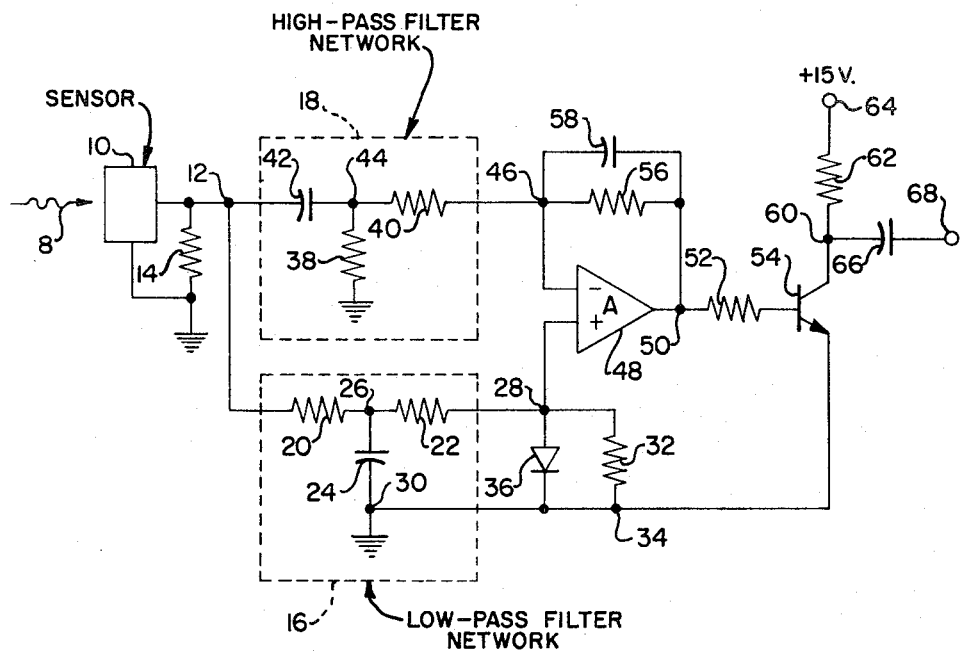
INVENTOR
RICHARD F. DURIG
BY *Louis A. Kline*
*Albert L. Sessler, Jr.*
HIS ATTORNEYS

United States Patent Office 3,400,270
Patented Sept. 3, 1968

3,400,270
FLASH DETECTION MEANS
Richard F. Durig, Dayton, Ohio, assignor to The National Cash Register Company, Dayton, Ohio, a corporation of Maryland
Filed May 10, 1965, Ser. No. 454,273
4 Claims. (Cl. 250—206)

ABSTRACT OF THE DISCLOSURE

A system for detection of flash illumination in the presence of varying levels of ambient illumination. A change in voltage output from a sensor is produced in response to a flash, and is applied to a signal-separating means for separating frequency components of the signal, which may take the form of parallel "low-pass" and "high-pass" filters. The outputs of the filters are applied to the inputs of a difference amplifier, the output of which may be applied to a level detector, or directly to a utilizing device. The gain of the two channels of the difference amplifier can be changed by altering the circuit components to produce a desired output signal in response to a desired proportion of flash illumination to ambient illumination. A diode is added to the circuit to reduce the proportion of flash illumination to ambient illumination which is required to produce a change in the output of the level detector, as the level of ambient illumination increases.

The invention herein described was made in the course of or under a contract or subcontract thereunder with the Department of the Air Force.

This invention relates generally to flash detection means, and more particularly relates to novel flash detection means in which flashes can be detected in the presence of varying levels of ambient illumination.

Many uses exist for flash detection systems, one example of which is the incorporation of such a system into an eye-protective device for use in connection with high-intensity flashes of light. The present system is operated by low-amplitude flashes at night or in darkness, when the pupillary diameter of the eye is largest and the eye is most susceptible to flash-blindness. Conversely, when the pupillary diameter is smallest, as in bright daylight conditions, and the flash blindness threshold is accordingly higher, the system requires a higher-amplitude flash to cause operation.

In accordance with the present invention, the illumination level external of the flash detection system is sensed by a photovoltaic or photoconductive type of detector or sensor, from which is produced a voltage output proportional to the illumination falling thereon. Changes in the level of illumination produce corresponding changes in the voltage output. This voltage output is applied to a signal-separating means for separating frequency components of the signal, which may take the form of a pair of parallel input band-pass filters, one of which is a "low-pass" filter, and the other of which is a "high-pass" filter. The outputs of the filters are applied to the inputs of a difference amplifier, and the output of said amplifier is, in turn, applied to a level detector, or, if desirtd, directly to a utilizing device. The circuit parameters of the system may be selected and varied so that when a flash illumination reaches some given percentage of the ambient illumination, a change in the output of the level detector is caused, which may be used to trigger an eye-protective device, or for any other suitable purpose. The circuit parameters may conveniently be changed by altering the gain of the two channels of the difference amplifier in accordance with the particular requirements of a given system. In addition, means are provided to reduce the proportion of flash illumination to ambient illumination which is required to produce a change in the output of the level detector, as the level of ambient illumination increases.

The present system is particularly advantageous in that it provides flash detection means requiring only one detector or sensor, and in that it provides detection means capable of operating on the basis of a proportional difference between flash and ambient illumination, rather than on the basis of a predetermined absolute magnitude of difference between flash and ambient illumination.

It is accordingly an object of the present invention to provide novel flash detection means of simple, efficient design.

A further object is to provide means capable of detecting light flashes in the presence of varying ambient illumination.

An additional object is to provide flash detection means in which a single sensing device is associated with a system capable of detecting flash illumination in the presence of varying ambient illumination.

Another object is to provide flash detection means in which the detection of flashes is based upon an increase in illumination of a predetermined proportion over the ambient illumination level, rather than an increase of some predetermined absolute magnitude.

Still another object is to provide flash detection means in which the detection of flashes is based upon an increase in illumination of a predetermined proportion over the ambient illumination level, with the proportion being reduced at higher levels of ambient illumination.

With these and other objects, which will become apparent from the following description, in view, the invention includes certain novel features of construction and combinations of parts, a preferred form or embodiment of which is hereinafter described with reference to the drawing which accompanies and forms a part of this specification.

Referring now to the drawing, there is shown a sensor 10 for sensing illumination external of the system, represented by the wavy line 8. A photovoltaic device such as a photodiode or solar cell may suitably be employed as the sensor, although it will be realized that other types of commercially available light-detecting devices, such as photoconductive elements, might also be utilized, with any resulting necessary modification of the system shown in the drawing being obvious to one skilled in the art.

One output terminal of the sensor 10 is connected to a base reference potential, shown in the drawing as ground, while the other terminal is connected to a point 12. A load resistor 14 is connected in parallel with the sensor 10 between the point 12 and ground.

From the point 12, two alternate circuit paths extend to two parallel filter networks generally designated 16 and 18, the network 16 being of the "low-pass" type, and the network 18 being of the "high-pass" type. The filter network 16 may typically provide a flat response for signals ranging from a direct current signal to a signal having a frequency of approximately sixteen cycles per second, while the filter network 18 may typically provide a flat response in the range from about sixteen cycles per second to about ten thousand cycles per second. It will be recognized that these ranges are merely illustrative and are not intended to limit the invention to any particular ranges.

Included in the "low-pass" filter network 16 are two resistors 20 and 22, together with a capacitor 24. As may be seen in the drawing, one end of the resistor 20 is connected to the point 12, while the other end of said resistor is connected to the point 26. The resistor 22 is connected at one end to the point 26 and at the other end to a point 28, while the capacitor 24 is connected between the point 26 and a further point 30, which in turn is connected to a base reference potential, shown in the drawing as ground.

The point 28 is also connected over a resistor 32, a point 34, and the point 30, to ground. A diode 36 is shown in the drawing in parallel with the resistor 32, between the points 28 and 34. This diode is not essential to the operation of the circuit but provides means for altering the response of the circuit in situations of high ambient illumination level, as will subsequently be described. The resistor 32 and the diode 36 form a part of the feedback circuitry for the difference amplifier which is included in the circuit, as will also be subsequently described.

Included in the "high-pass" filter network 18 are two resistors 38 and 40, together with a capacitor 42. The capacitor 42 is connected between the point 12 and an additional point 44, whence a first path extends over the resistor 38 to a base reference potential shown as ground, and from which point a second path extends over the resistor 40 to a further point 46.

The points 28 and 46 in the output paths of the filter networks 16 and 18 are connected to the two inputs of a conventional, commercially available difference amplifier shown in block form at 48 in the drawing. This amplifier is effective to amplify the difference in the potentials appearing at the points 28 and 46. It will be recognized that some other suitable type of signal-separating device might be used in place of the filter networks 16 and 18, if desired, in which case the points 28 and 46 could be considered as outputs for such a device.

The output of the amplifier 48 is connected over a point 50 and a resistor 52 to a suitable level detection device, shown here as an NPN-type transistor 54, to the base of which the resistor 52 is connected. If desired, the output of the amplifier 48 could be directly connected to a utilizing device.

A parallel combination of a resistor 56 and a capacitor 58 is connected between the points 46 and 50 to provide a feedback path for the associated input channel of the difference amplifier, as will subsequently be described in greater detail.

The emitter of the transistor 54 is connected to ground over the point 34, while the collector of said transistor is connected over a point 60 and a resistor 62 to a terminal 64, to which is applied a source of potential of suitable value, which, in the illustrated embodiment, is plus 15 volts. From the point 60, a suitable output connection extends over a coupling capacitor 66 to an output terminal 68, from which an output signal may be taken.

In the illustrated embodiment of the flash detection system of the present invention, circuit components of the following type or value may be employed:

| Components: | Values |
|---|---|
| Resistor: | |
| 14 _____ohms__ | 10 |
| 20 _____do____ | 470 |
| 22 _____do____ | 47,000 |
| 32 _____do____ | 100,000 |
| 38 _____do____ | 220 |
| 40 _____do____ | 1,000 |
| 52 _____do____ | 270 |
| 56 _____do____ | 56,000 |
| 62 _____do____ | 470 |
| Capacitor: | |
| 24 _____microfarads__ | 22 |
| 42 _____do____ | 4.7 |
| 58 _____micromicrofarads__ | 100 |
| 66 _____microfarads__ | 0.1 |
| Diode 36 _____ | 1N949 |
| Transistor 54 _____ | 2N338 |
| Solar cell 10 _____ | (1) |
| Amplifier 48 _____ | (2) |

[1] CC20M manufactured by Solar Systems, Inc., 8421 North Kimball Street, Skokie, Ill., United States of America.
[2] P65A operational amplifier manufactured by George A. Philbrick Researchers Inc., Boston, Mass., United States of America.

Of course, it will be realized that the above component types and values, as well as the voltage levels given in the specification, are merely illustrative, and could be altered to meet specific circuit requirements.

The mode of operation of the flash detection system of the present invention will now be described.

Changing external illumination levels, which may be due either to flash illumination or to varying ambient illumination, are detected by the sensor 10, which provides a voltage output signal proportional in amplitude to the intensity of the illumination and proportional in frequency to the rate of change of the illumination from one level of intensity to another.

From the point 12, the signal produced by the sensor 10 continues over two paths to the "low-pass" filter network 16 and the "high-pass" filter network 18. Since the filter network 16 is directly coupled to one input of the difference amplifier 48, and since the ambient illumination falling upon the sensor 10 produces a D.C. or low-frequency A.C. signal, an output signal is produced by the amplifier 48 and is applied over the resistor 52 to the base electrode of the transistor 54, causing said transistor to conduct, so that an output signal of a given level is seen at the output terminal 68. The signal produced by the ambient illumination is not transmitted through the "high-pass" filter network 18, and therefore is not applied to the other input of the amplifier 48.

Flash illumination, with its rapid rate of change of intensity, produces a relatively high-frequency signal output when it falls upon the sensor 10. Such a signal accordingly is not transmitted through the "low-pass" filter network 16, but is transmitted through the "high-pass" filter network 18.

Therefore, when a flash is detected by the sensor 10, the high-frequency component of the resulting signal is passed through the filter network 18 to the associated input of the difference amplifier 48. At the same time, the low-frequency or D.C. components of the resulting signal, representing the ambient illumination, is passed through the filter network 16 to the associated input of the difference amplifier 48. For some predetermined proportion of flash intensity with respect to ambient intensity, depending upon the specific values of the circuit components, the two components of the signal, as amplified by the respective channels of the amplifier 48, will be substantially equal, thereby reducing the output signal of the difference amplifier 48 to a value below the minimum required as a biasing potential on the base of the transistor 54 to maintain said transistor in a conducting condition. The transistor accordingly ceases to conduct at this time, and a positive-going signal is applied across the capacitor 66 to the output terminal 68. This signal may be utilized in any desired manner, as, for example, the actuation of an eye-protective device to protect a user against retinal burn.

It is believed to be apparent from the above explanation that the output of the difference amplifier 48 is, in effect, the amplified ambient illumination minus the amplified flash illumination. Since the gain of the negative channel and the gain of the positive channel need not be the same for a difference amplifier, the amount of flash illumination required for triggering can be varied by varying the gain of the channels. The gain of the channels can be adjusted by varying the values of the feedback components associated with each channel, including the feedback resistor 32 for the low-frequency positive channel of the difference amplifier 48, and the resistor 56, together with the capacitor 58, for the high-frequency negative channel of the difference amplifier 48. The manner in which the gain for these channels can be adjusted by varying the component values is well known, and accordingly will not be specifically explained herein. It may be noted, as an example, that if for the present design the triggering level for the flash illumination is chosen to be about 70% of the ambient level, and if the circuit gains are adjusted so that the gain of the flash channel equals approximately 1.43 times the gain of the ambient channel, then zero output from the amplifier 48 will occur at the 70% point, and the circuit will generate the required trigger pulse at the output terminal 68. Once this gain ratio has been established, component values can be chosen from the gain equations for a conventional difference amplifier circuit.

Introduction of the diode 36 into the circuit in parallel with the feedback resistor 32 modifies the circuit so that the resultant voltage across the parallel combination of the resistor 32 and the diode 36 is a logarithmic function of the diode current. The effective gain of the ambient channel of the amplifier 48 is therefore significantly reduced at higher ambient illumination levels, and the proportion of flash illumination with respect to ambient illumination required for triggering at higher illumination levels is accordingly reduced. This is of value in certain applications of the system, as in eye-protective devices, where it is desirable to cause triggering of the system at certain high levels of illumination, even though the flash illumination may be a lower proportion of the ambient illumination than would be required to trigger the system at lower ambient illumination levels. The value of such an arrangement in an eye-protective application resides in the fact that the eye can withstand only so much total illumination without damage, even though the pupillary diameter of the eye is at a minimum.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A system for the detection of flash illumination comprising, in combination,
    a single sensor means arranged to detect both flash and ambient illumination from sources external of the system, and capable of producing an electrical potential of a magnitude which is proportional to the intensity of impinging illumination, and of a frequency which is proportional to the rate of change of the intensity of impinging illumination;
    first filter means associated with said sensor means and capable of passing D.C. and low-frequency signals representing ambient illumination therethrough, and blocking high-frequency signals;
    second filter means associated with said sensor means and capable of passing high-frequency signals representing flash illumination therethrough, and blocking D.C. and low-frequency signals;
    difference amplifying means having two channels with which the first and second filter means are associated, and an output, said amplifying means being operable to amplify the difference between the D.C. and low-frequency signals passed through the first filter means and the high-frequency signals passed through the second filter means, and to produce a signal representing said difference at the output; and
    feedback means associated with the difference amplifying means for determining the relative gain for the signals applied to the amplifying means through the first and second filter means.

2. The system of claim 1, also including a unidirectional signal translating device associated with the difference amplifying means for varying the sensitivity of the system at relatively high levels of ambient illumination.

3. A system for the detection of flash illumination comprising, in combination,
    a single sensor means arranged to detect both flash and ambient illumination from sources external of the system, and capable of producing an electrical potential of a magnitude which is proportional to the intensity of impinging illumination, and of a frequency which is proportional to the rate of change of the intensity of impinging illumination;
    first filter means associated with said sensor means and capable of passing D.C. and low-frequency signals representing ambient illumination therethrough, and blocking high-frequency signals;
    second filter means associated with said sensor means and capable of passing high-frequency signals representing flash illumination therethrough, and blocking D.C. and low-frequency signals;
    difference amplifying means having two channels with which the first and second filter means are associated, and an output, said amplifying means being operable to amplify the difference between the D.C. and low-frequency signals passed through the first filter means and the high-frequency signals passed through the second filter means, and to produce a signal representing said difference at the output; and
    separate feedback means associated with the two inputs of the difference amplifying means, to determine the gain of the amplifying means with respect to the signals received from the first and second filter means, and thereby determine the relative values of signals passed through said first and second filter means necessary to produce a given output signal from the difference amplifying means.

4. The system of claim 3, also including a unidirectional signal translating device in the feedback means associated with the channel of the difference amplifying means which is associated with the first filter means, said unidirectional signal translating device functioning to alter the gain of said channel when a signal of relatively high magnitude appears thereon as a result of sensing of a high ambient illumination level by the sensor means.

References Cited

UNITED STATES PATENTS

| | | | |
|---|---|---|---|
| 2,906,886 | 9/1959 | Hafstad et al. | 250—214 X |
| 3,064,578 | 11/1962 | Henderson et al. | 250—206 X |
| 3,129,424 | 4/1964 | Rabinow | 250—206 X |
| 3,196,275 | 7/1965 | Atkins et al. | |
| 3,273,458 | 9/1966 | Kohler | 250—206 |
| 3,321,630 | 5/1967 | Durig et al. | 250—206 X |

RALPH G. NILSON, *Primary Examiner.*

M. A. LEAVITT, *Assistant Examiner.*